United States Patent [19]

Heitz et al.

[11] Patent Number: 4,946,937

[45] Date of Patent: Aug. 7, 1990

[54] VINYLENE COPOLYMER

[75] Inventors: Walter Heitz, Kirchhain; Andreas Greiner, Marburg-Moischt, both of Fed. Rep. of Germany

[73] Assignee: Bayer Aktiengesellschaft, Leverkusen, Fed. Rep. of Germany

[21] Appl. No.: 339,076

[22] Filed: Aug. 9, 1989

Related U.S. Application Data

[62] Division of Ser. No. 201,879, Jun. 3, 1988.

[30] Foreign Application Priority Data

Jun. 13, 1987 [DE] Fed. Rep. of Germany ....... 3719851

[51] Int. Cl.$^5$ .............................................. C08G 61/02
[52] U.S. Cl. .................... 528/392; 526/242; 526/249; 526/250; 526/251; 528/86; 528/205; 528/396; 528/397
[58] Field of Search ................ 528/392, 205, 86, 396, 528/397; 526/249, 242, 250, 251

[56] References Cited

U.S. PATENT DOCUMENTS

| | | | |
|---|---|---|---|
| 2,135,122 | 11/1938 | Coleman et al. | 528/392 |
| 2,257,201 | 9/1941 | Smith et al. | 528/392 |
| 3,193,538 | 7/1965 | Canterino et al. | 528/392 |
| 4,626,588 | 12/1986 | Murase et al. | 528/392 |

OTHER PUBLICATIONS

Morrison and Boyd, Organic Chemistry, 1973: Boston, 3rd Ed., p. 1033.

*Primary Examiner*—Harold D. Anderson

[57] ABSTRACT

Vinylene copolymers composed of recurrent structural units of formula I

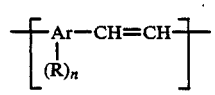
(I)

wherein Ar denotes an aromatic or heterocyclic group, R denotes an inert substituent and n stands for an integer with a value from 0–8 and processes for their preparation.

1 Claim, No Drawings

VINYLENE COPOLYMER

This is a division of application Ser. No. 201,879 filed June 3, 1988 pending.

This invention relates to a process for the preparation of vinylene copolymers containing the recurrent structural unit:

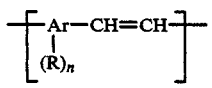
(I)

wherein Ar denotes an aromatic or heterocyclic group, R denotes hydrogen or an inert substituent and n represents an integer with a value from 0 to 8. The degree of polymerisation of these vinylene copolymers is from 3 to 1000, preferably from 3 to 100, especially from 3 to 20.

Ar is preferably a divalent group derived from benzene, naphthalene, phenanthrene or biphenyl or from groups corresponding to the following formulae:

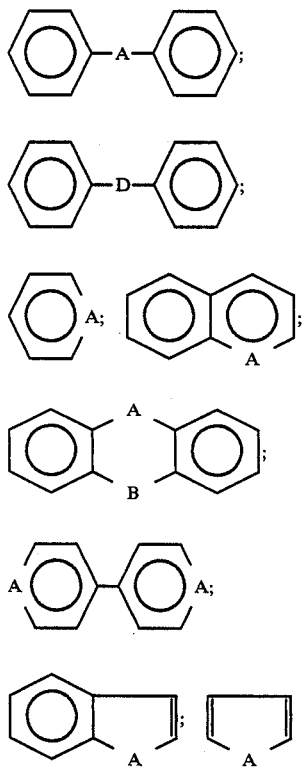

wherein A and B denote oxygen, nitrogen or sulphur and D denotes one of the following groups:

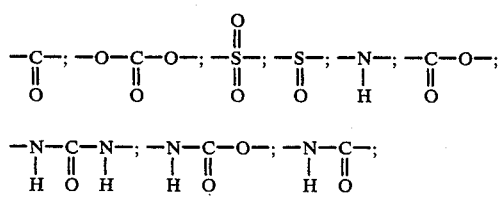

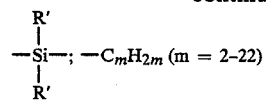

wherein R'=alkyl.

The following are preferred groups denoted by R:

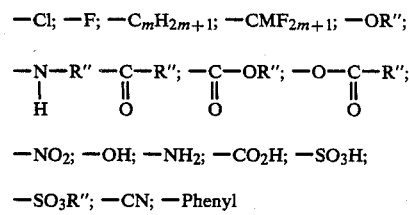

—NO$_2$; —OH; —NH$_2$; —CO$_2$H; —SO$_3$H;

—SO$_3$R''; —CN; —Phenyl wherein
m=1 to 18 and
R''=C$_m$H$_{2m+1}$, phenyl, alkylphenyl, naphthyl, pyridyl or bipheyl.

Preferred vinylene copolymers according to the invention are those containing recurrent units of formula I in which
A stands for a phenylene group and R stands for a fluoroalkyl group with 1 to 4 carbon atoms, preferably trifluoromethyl, and n stands 1 or 2, and those in which Ar stands for an aromatic or heterocyclic group as defined for formula I with the exclusion of phenylene and R and n have the meanings indicated for formula I.

Particularly preferred vinylene copolymers are those having recurrent structural units of the following formulae:

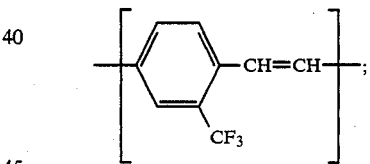

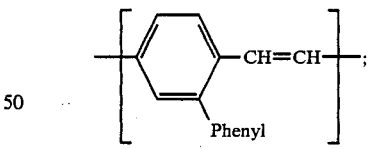

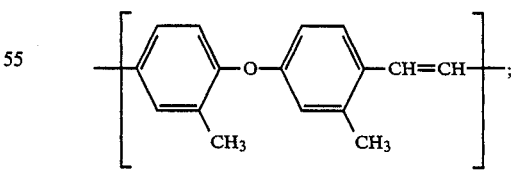

The vinylene copolymers of formula (I) may be prepared by the reaction of aromatic halogen compounds corresponding to the following formula:

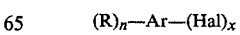
(II)

with ethylene or by the reaction of halogenated vinyl compounds of the following formula:

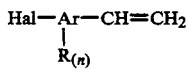 (III)

In the above formulae (II) and (III), R, n and Ar have the meanings indicated above, x may stand for 2, 3, 4 or a larger integer and Hal stands for chlorine, bromine or iodine, preferably bromine. The value for x is preferably 2. When x>2, branched structural elements are formed which are no longer covered by formula (I).

The aromatic halogen compounds of formula (II) which are reacted with ethylene are therefore preferably dihalogen compounds, optionally used in admixture with minor quantities of tri- or tetra-halogen compounds, depending on the amount of branching or cross-linking desired.

The following are preferred compounds of formula (II):

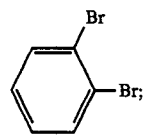

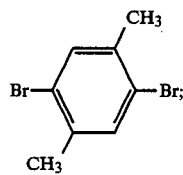

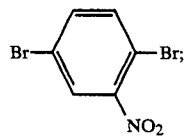

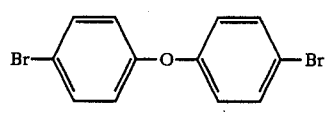

The following are preferred compounds of formula (III):

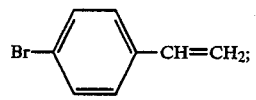

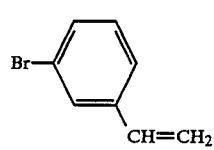

Reaction of the compounds (II) with ethylene or of the compounds of formula (III) is generally carried out in an inert polar solvent such as N,N-dimethylformamide, N-methylpyrrolidone or chloroform. It requires temperatures of about 70° to about 150° C. and may take e.g. 1 to 72 hours.

A catalyst is also required, preferably a combination of a palladium compound (palladium, palladium-O complex, palladium-II salts such as palladium chloride and palladium acetate, and palladium black) with a triarylphosphine such as tri-o-tolyl-phosphine or a secondary amine. The reaction requires the presence of a base in excess, e.g. a tertiary amine (triethylamine, tributylamine) or a basic salt (e.g. sodium acetate).

If the reaction is carried out with ethylene, a pressure reactor is preferably employed, in which the halogen compound, solvent and catalyst are introduced and gaseous ethylene is then forced in to a pressure of from 0.1 to 50 bar. After termination of the reaction, the polymer obtained may be precipitated with a precipitating agent (water, alcohol), separated, washed with a solvent and dried (e.g. under vacuum at temperatures of up to 250° C).

If the reaction is carried out with compounds of formula (III), pressure may again be employed (e.g. under an inert gas such as argon), preferably up to 10 bar. The reaction may also be carried out under an inert gas without pressure. In that case compounds of formula (I) and compounds of formula (III) are preferably put into the process in about equivalent quantities. The conditions are otherwise the same as those employed for the reaction with ethylene.

The polymers according to the invention are in most cases clear or yellow coloured solids. Some are fusible and the melts are in most cases orange in colour. They give rise to vitreous products on cooling. The softening point is above 100° C. The products are suitable for the production of moulded bodies, including foils and fibres, by conventional methods.

EXAMPLES

Example 1

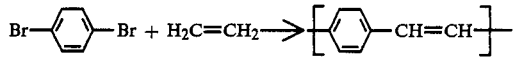

20 mmol of 1,4-dibromobenzene (4.718 g), 0.8 mol of palladium-(II) acetate (0.179 g), 4 mmol of tri-o-(tolyl)-phosphine (1.216 g), 50 mmol of triethylamine (5.06 g) and 50 ml of dimethylformamide are introduced into a 130 ml steel autoclave which is rinsed twice with nitrogen and then evacuated (about 1 torr). The autoclave is ventilated with 21 mmol of ethylene (0.589 g) and heated to 100° C. for 24 hours.

After cooling of the reaction mixture, the contents of the autoclave are introduced into 500 ml of dilute hydrochloric acid and the solid is filtered off, washed with 200 ml of water, extracted with methanol for 24 hours and dried in a vacuum at 80° C.

Yield: 1.38 g (68%), m.pt. above 350° C.

EXAMPLE 2

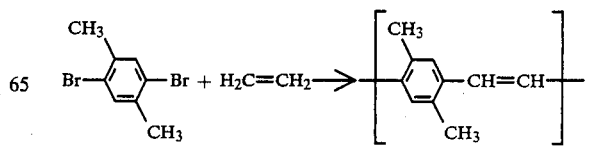

20 mmol of 1,4-Dibromo-p-xylene (5.279 g), 0.8 mmol of palladium-(II) acetate (0.179 g), 4 mmol of tri-(o-tolyl) phosphine (1.216 g), 50 mmol of triethylamine (5.06 g) and 50 ml of dimethylformamide are introduced into a 130 ml steel autoclave, rinsed twice with nitrogen and then evacuated (about 1 torr). The autoclave is ventilated with 21 mmol of ethylene (0.589 g) and heated to 100° C. for 24 hours.

After cooling of the reaction mixture, the contents of the autoclave are introduced into 500 ml of dilute hydrochloric acid and the solid is filtered off, washed with 200 ml of water, extracted with methanol for 24 hours and dried in a vacuum at 80° C.

Yield: 1.4 g (92%). m.pt. above 350° C.

EXAMPLE 3

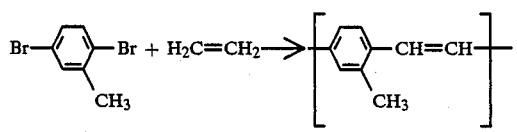

20 mmol of 2,5-Dibromotoluene (4.998 g), 0.8 mmol of palladium-(II) acetate (0.179 g), 4 mmol of tri-(o-tolyl)-phosphine (1.216 g), 50 mmole of triethylamine (5.06 g) and 50 ml of dimethylformamide are introduced into a 130 ml steel autoclave, rinsed twice with nitrogen and then evacuated (about 1 torr). The autoclave is ventilated with 21 mmol of ethylene (0.589 g) and heated to 100° C. for 24 hours.

After cooling of the reaction mixture, the contents of the autoclave are introduced into 500 ml of dilute hydrochloric acid and the solid is filtered off, washed with 200 ml of water, extracted with methanol for 24 hours and dried in a vacuum at 80° C.

Yield: 2.2 g (95%), softening from 250° C.

Infra-red spectrum (in $cm^{-1}$): 3020; 1505; 1450; 965; 892; 830.

Example 4

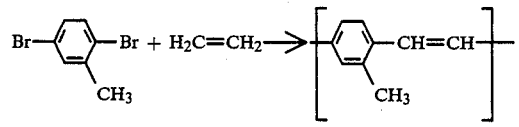

20 mmol of 2,5-Dibromobenzotrifluoride (6.079 g), 0.8 mmol of palladium-(II) acetate (0.179 g), 4 mmol of tri-(o-tolyl)-phosphine (1.216 g), 50 mmol of triethylamine (5.06 g) and 50 ml of dimethylformamide are introduced into a 130 ml steel autoclave, rinsed twice with nitrogen and then evacuated (about 1 torr). The autoclave is ventilated with 21 mmol of ethylene (0.589 g) and heated to 100° C. for 24 hours.

After cooling of the reaction mixture, the contents of the autoclave are introduced into 500 ml of dilute hydrochloric acid and the solid is filtered off, washed with 200 ml of water, extracted with methanol for 24 hours and dried in a vacuum at 80° C.

Yield: 3.0 g (95%), softening from 300° C.

Infra-red spectrum (in $cm^{-1}$): 3020; 1500; 1320; 1130; 1060; 960; 900; 840.

Example 5

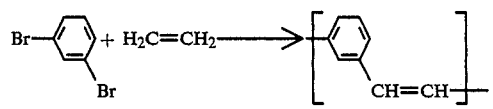

20 mmol of 2,5-Dibbomobenzene (4.718 g), 0.8 mmol of palladium-(II) acetate (0.179 g), 4 mmol of tri-(o-tolyl)-phosphine (1.216 g), 50 mmol of triethylamine (5.06 g) and 50 ml of dimethylformamide are introduced into a 130 ml steel autoclave, rinsed twice with nitrogen and then evacuated (about 1 torr). The autoclave is ventilated with 21 mmol of ethylene (0.589 g) and heated to 100° C. for 24 hours.

After cooling of the reaction mixture, the contents of the autoclave are introduced into 500 ml of dilute hydrochloric acid and the solid is filtered off, washed with 200 ml of water, extracted with methanol for 24 hours and dried in a vacuum at 80° C.

Yield: 1.9 g (93%).

Infra-red spectrum (in $cm^{-1}$): 3023; 1595; 963; 695.

Example 6

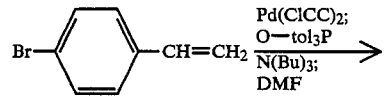

3.6 g of p-bromostyrene (20 mmol), 0.112 g of palladium(II) acetate (0.5 mmol), 0.46 g of tri-(o-tolyl)-phosphine (1.5 mmol) 7.8 g of tributylamine (42 mmol) and 100 ml of dimethylformamide were heated to 140° C. in a 250 ml three-necked flask with attached reflux condenser under a nitrogen atmosphere for 64 hours.

After cooling of the reaction mixture the contents of the flask were introduced into 200 ml of dilute hydrochloric acid and the solid was filtered off, washed with 10% hydrochloric acid and water, extracted with ethanol and toluene and dried in a vacuum.

Yield: 1.5 g (73%); m.pt. above 350° C.

Bromine content 4.72%.

We claim:

1. A polymer composed of recurrent structural units of formula (I)

$$\left[\begin{array}{c} Ar-CH=CH \\ | \\ (R)_n \end{array}\right] \quad (I)$$

wherein Ar denotes a phenylene group, R denotes a fluoroalkyl group with 1 to 4 carbon atoms and n denotes 1 or 2.

* * * * *